United States Patent
Mochizuki et al.

(10) Patent No.: US 8,503,319 B2
(45) Date of Patent: Aug. 6, 2013

(54) DATA PROCESSOR AND COMMUNICATION SYSTEM

(75) Inventors: Yoshinori Mochizuki, Sagamihara (JP); Harumi Morino, Yokohama (JP); Takatoshi Kato, Yokohama (JP); Tsutomu Tsuboi, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 209 days.

(21) Appl. No.: 12/917,479

(22) Filed: Nov. 2, 2010

(65) Prior Publication Data

US 2011/0110397 A1 May 12, 2011

(30) Foreign Application Priority Data

Nov. 5, 2009 (JP) ................................ 2009-253929

(51) Int. Cl.
  *H04L 12/56* (2006.01)
(52) U.S. Cl.
  USPC ........................................................ 370/252
(58) Field of Classification Search
  None
  See application file for complete search history.

(56) References Cited

U.S. PATENT DOCUMENTS

| | | | |
|---|---|---|---|
| 6,680,922 B1 | 1/2004 | Jorgensen | |
| 6,865,609 B1 | 3/2005 | Gubbi et al. | |
| 6,934,752 B1 | 8/2005 | Gubbi | |
| 6,957,071 B1 | 10/2005 | Holur et al. | |
| 2004/0033806 A1* | 2/2004 | Daniel et al. | 455/450 |
| 2005/0259617 A1 | 11/2005 | Wason et al. | |
| 2005/0289618 A1* | 12/2005 | Hardin | 725/95 |
| 2006/0198353 A1 | 9/2006 | Wason et al. | |
| 2007/0195710 A1 | 8/2007 | Nakata | |
| 2008/0043657 A1 | 2/2008 | Ishii et al. | |

FOREIGN PATENT DOCUMENTS

| | | |
|---|---|---|
| JP | 2002-111728 A | 4/2002 |
| JP | 2004-104529 A | 4/2004 |
| JP | 2005-323375 A | 11/2005 |
| JP | 2006-115357 A | 4/2006 |
| JP | 2008-311902 A | 12/2008 |
| JP | 2009-049514 A | 3/2009 |
| WO | WO 02/06986 A2 | 1/2002 |
| WO | WO 2005/081559 A1 | 9/2005 |

OTHER PUBLICATIONS

Fan et al., "Bandwidth allocation in UWB WPANs with ECMA-368 MAC", Computer Communications, Elsevier Science Publishers BV, vol. 32, No. 5, (2009), pp. 954-960.

Kuo et al., "Supporting Real-Time VBR Video Transport on WiMedia-Based Wireless Personal Area Networks", IEEE Transactions on Vehicular Technology, vol. 58, No. 4, May 2009, pp. 1965-1971.

ECMA International "Standard ECMA-368 High Rate Ultra Wideband PHY and MAC Standard", 2$^{nd}$ Edition, Internet Citation, Dec. 2007, pp. I-VIII and 1-330.

Office Action issued Apr. 18, 2013, in Japanese Patent Application No. 2009-253929.

* cited by examiner

*Primary Examiner* — Raj Jain
(74) *Attorney, Agent, or Firm* — Miles & Stockbridge P.C.

(57) ABSTRACT

A data processor which can flexibly control bandwidth settings and setting changes is provided. The data processor controls bandwidth allocation to electronic devices participating in a communication network. The data processor has a communication section used to communicate with the electronic devices and a bandwidth management section which performs control to variably allocate, based on requests from the electronic devices, bandwidths to be used for communication by the electronic devices. In cases where an additional device is added to the communication network and an adequate bandwidth cannot be allocated to the additional device, the bandwidth management section requests another electronic device transmitting video data of a resolution higher than corresponding to the user's intention to change its data format so as to allow an adequate bandwidth to be allocated to the additional device.

7 Claims, 14 Drawing Sheets

Fig.2B

· BANDWIDTH MANAGEMENT TABLE

| SENDER MAC ADDRESS | TYPE | USABLE FORMAT | DESTINATION MAC ADDRESS | REQUESTED BANDWIDTH | ACQUIRED BANDWIDTH | REQUESTED FORMAT | ACQUIRED FORMAT | BANDWIDTH SECURED PERIOD | PRIORITY |
|---|---|---|---|---|---|---|---|---|---|
| | | | | | | | | | |
| | | | | | | | | | |

220  221  222  223  224  225  226  227  228  229

· DEVICE-BANDWIDTH CORRESPONDENCE TABLE

| SENDER MAC ADDRESS | USABLE BANDWIDTH | USABLE FORMAT | USABLE CHANNEL | USABLE SLOT | BANDWIDTH RETAINABLE PERIOD |
|---|---|---|---|---|---|
|  |  |  |  |  |  |
|  |  |  |  |  |  |

320　321　322　323　324　325

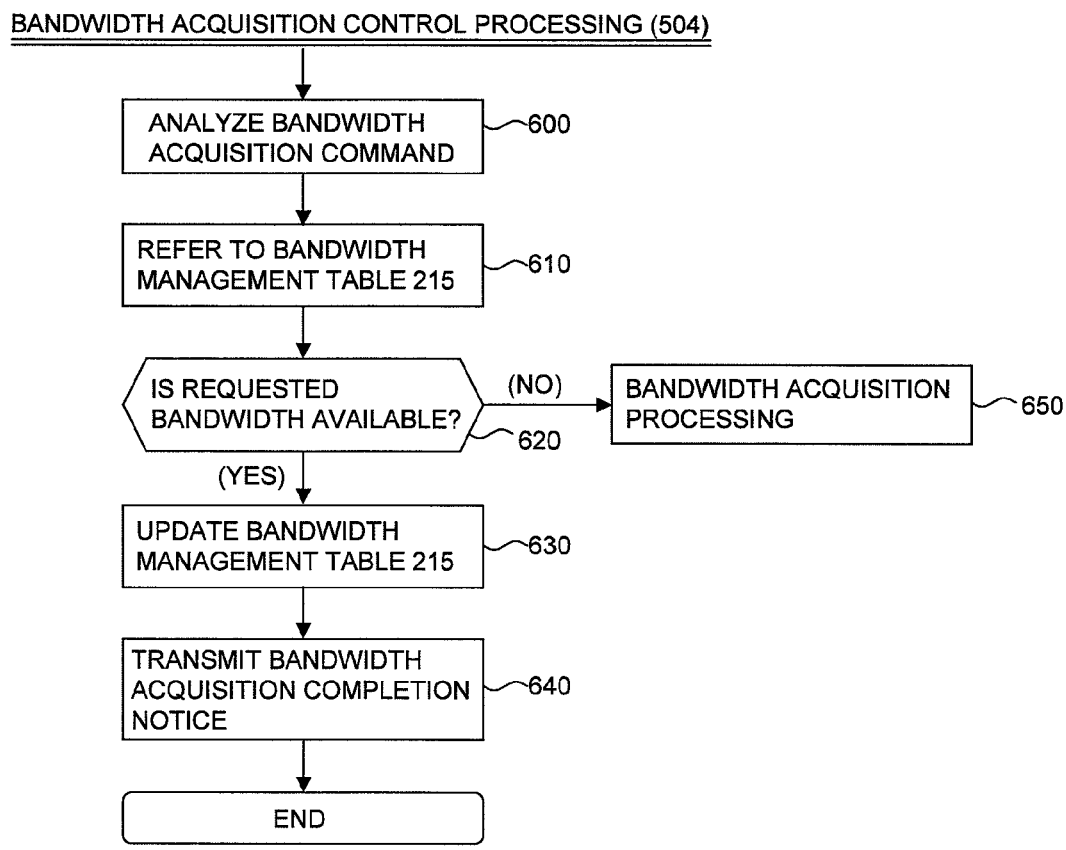

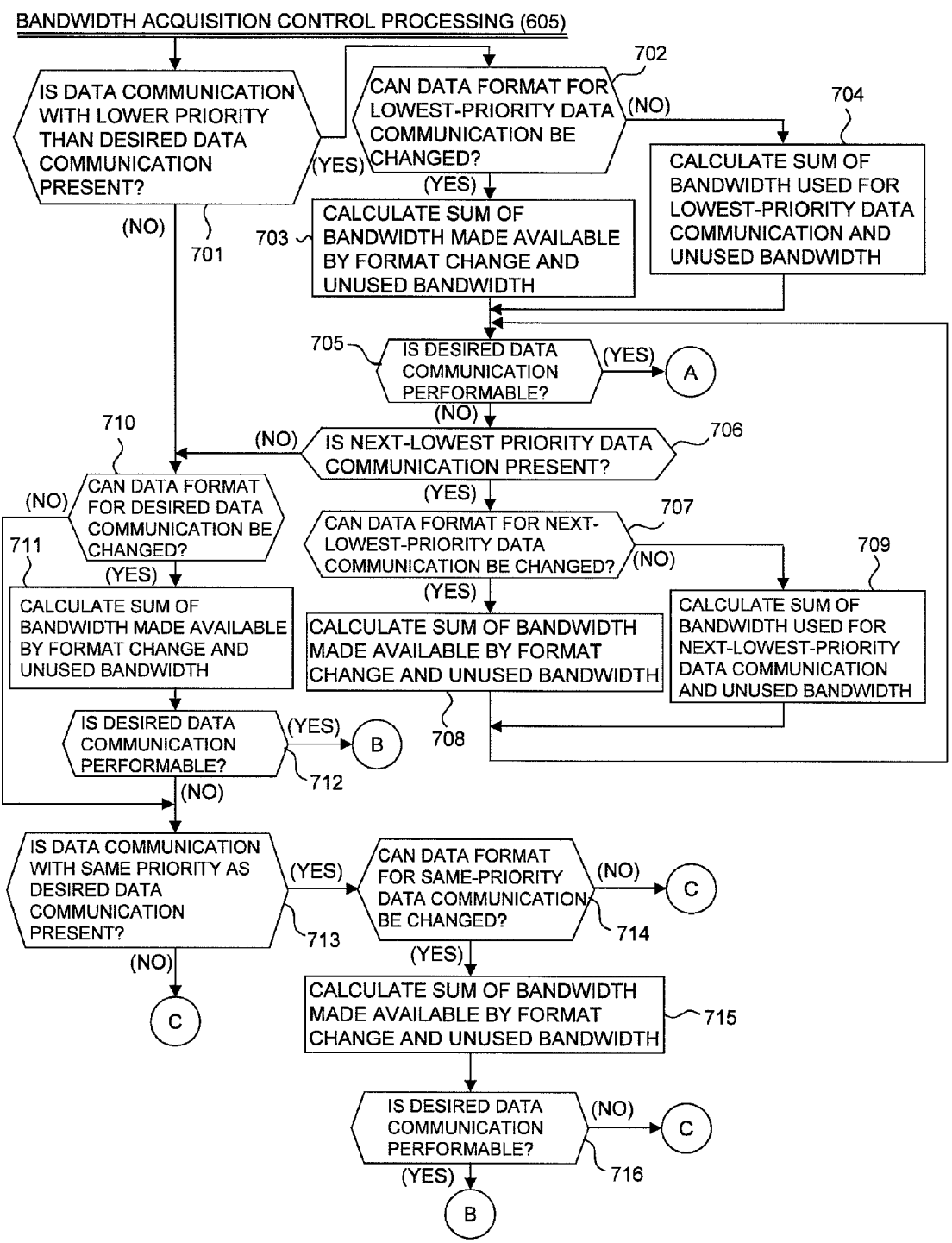

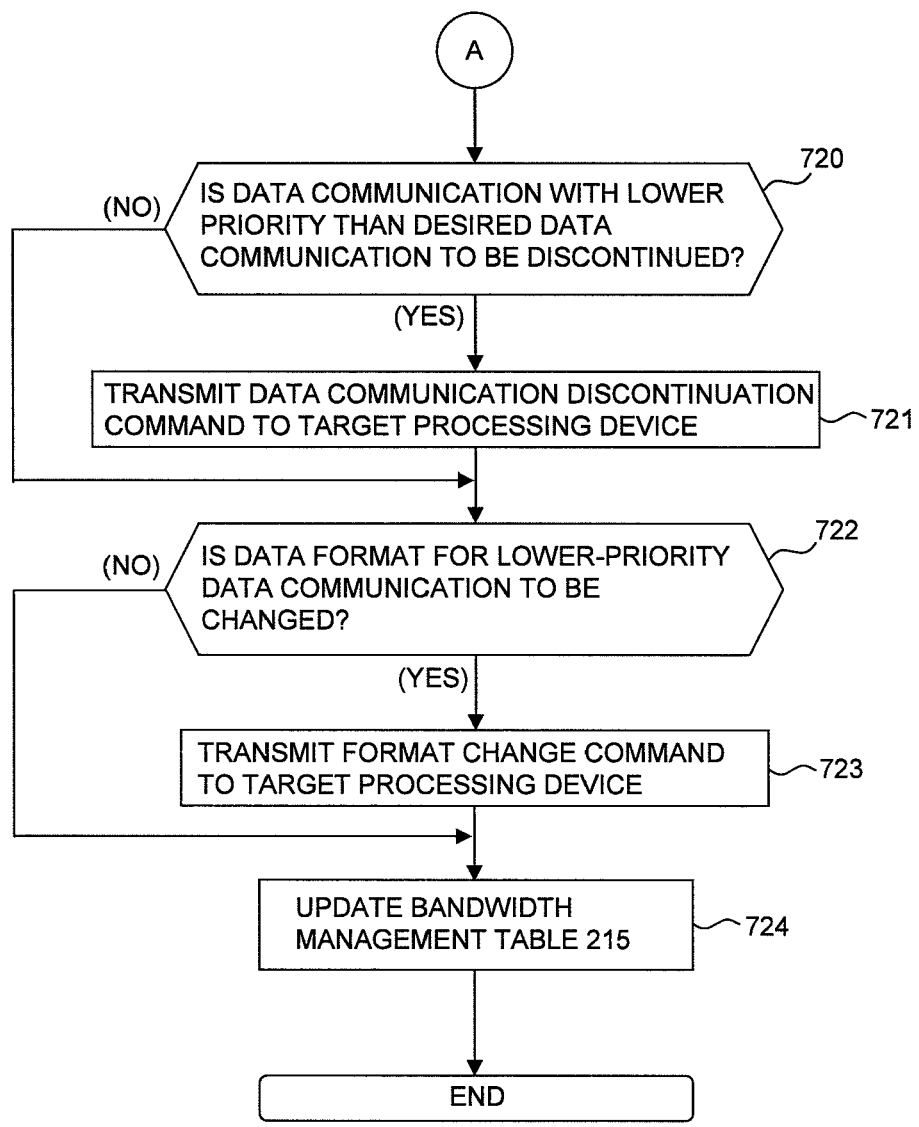

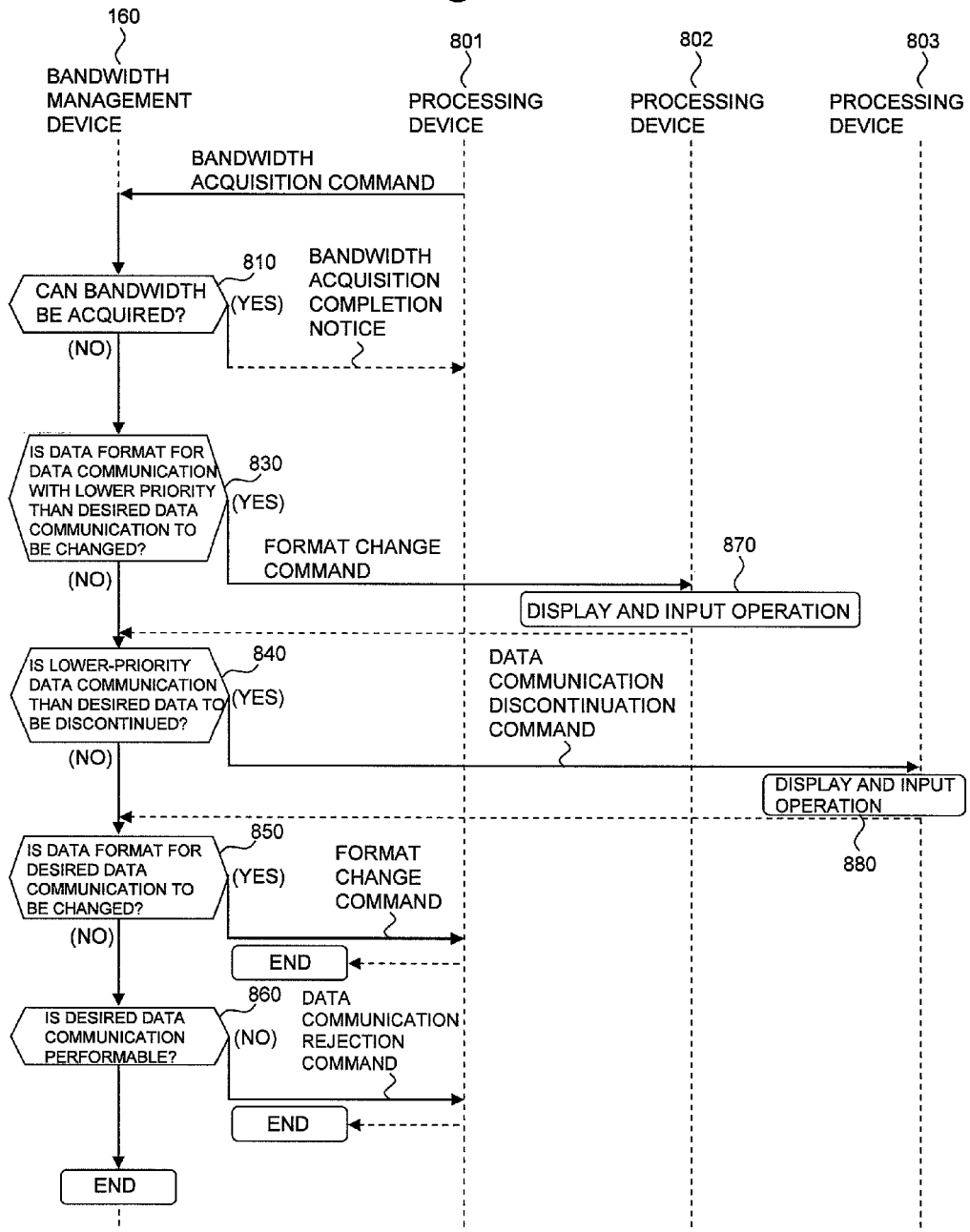

DATA PROCESSOR AND COMMUNICATION SYSTEM

CLAIM OF PRIORITY

The present application claims priority from Japanese patent application JP 2009-253929 filed on Nov. 5, 2009, the content of which is hereby incorporated by reference into this application.

FIELD OF THE INVENTION

The present invention relates to a technique for controlling bandwidths for devices participating in a communication network.

BACKGROUND OF THE INVENTION

In recent years, wireless communications requiring no communication cables are widely used. In these days, ultra-wideband (UWB) communication which can be performed using a bandwidth of several GHz at such a high rate of several hundred Mbps has been collecting attention. The ECMA-368 (European Computer Manufacturer Association-368) is a standard for UWB communication. In the ECMA-368 standard, only two layers are defined, physical layer and media access control (MAC) layer. It is therefore possible, when necessary to realize an application requiring high-speed wireless communication, to define a protocol for a higher layer than the MAC layer.

In the ECMA-368 standard, bandwidth management for devices present in a same network is not defined. For each application, therefore, it is necessary to define a bandwidth management arrangement as a higher-layer protocol than the MAC layer.

In Wireless USE (registered trademark, hereinafter omitted), which is an ECMA-368 based application, for example, a device called a host controller (hereinafter referred to as a "host device") provided with a module performs bandwidth management. To be concrete, the host device secures a bandwidth for the whole network in advance and, every time an additional device joins the network, the host device allocates a bandwidth to the additional device.

There are also bandwidth management methods applied when using a wireless interface (IF) which is not an UWB interface. In one of such methods, communication line utilization efficiency is improved by calculating an optimum bandwidth for use in stream data exchanges based on information about the condition of communication, for example, packet intervals (see Patent Document 1). In another of such methods, the condition of utilization of each service executed on a network is observed, a bandwidth to be made available for each service is calculated based on the condition of utilization and service priority, and picture quality is converted based on the calculated bandwidth value (see Patent Document 2).
Patent Document 1
Japanese Unexamined Patent Publication No. 2009-49514
Patent Document 2
Japanese Unexamined Patent Publication No. 2008-311902

SUMMARY OF THE INVENTION

In the bandwidth management method used for Wireless USB communication, however, when bandwidth allocation is requested by a device added to the network, the host device allocates a bandwidth without regard to the minimum bandwidth required by the additional device to engage in data communication. This allows a wider bandwidth than required to be allocated to the additional device and possibly causes that another device subsequently added to the network cannot have a bandwidth required to engage in data communication allocated to it. Furthermore, with the bandwidth management methods disclosed in Patent Documents 1 and 2, bandwidth allocation cannot be dynamically changed. This problem is not limited to Wireless USB communication. The same problem is also supposed to occur in bandwidth control performed for devices participating in other types of communication networks.

An object of the present invention is to provide a data processor which can flexibly control bandwidth settings and setting changes for a communication network.

The above and other objects, and novel features of the present invention will become apparent from the following detailed description made with reference to the accompanying drawings.

The representative elements of the invention are briefly described below.

A data processor is used to control bandwidth allocation to electronic devices participating in a communication network. The data processor has a communication section used to communicate with electronic devices and a bandwidth management section which performs control to variably allocate, upon request from an electronic device, a bandwidth to be used for communication by the electronic device. The bandwidth management section makes it possible to allocate an optimum bandwidth for data communication to an electronic device. For example, in cases where an additional device is added to a communication network and an adequate bandwidth cannot be allocated to the device, an electronic device transmitting video data of a resolution higher than corresponding to the user's intention is requested to change its data format so as to allow an adequate bandwidth to be allocated to the additional device.

The advantageous effect brought about by the representative elements of the invention disclosed in the present specification is summarized as follows.

Namely, it is possible to flexibly set bandwidths and change the settings.

BRIEF DESCRIPTION OF THE DRAWINGS

FIG. 2B is an explanatory diagram showing example information stored in a bandwidth management table.

FIG. 6 is a flowchart showing a processing sequence for bandwidth acquisition control.

FIG. 7 is a flowchart showing a concrete processing sequence for bandwidth acquisition.

FIG. 8A is a flowchart showing a processing sequence continued from A marked in FIG. 7.

FIG. 9 is a flowchart showing command exchanges between processing devices.

DETAILED DESCRIPTION OF THE PREFERRED EMBODIMENTS

1. Summary of the Preferred Embodiments

Figure 1:
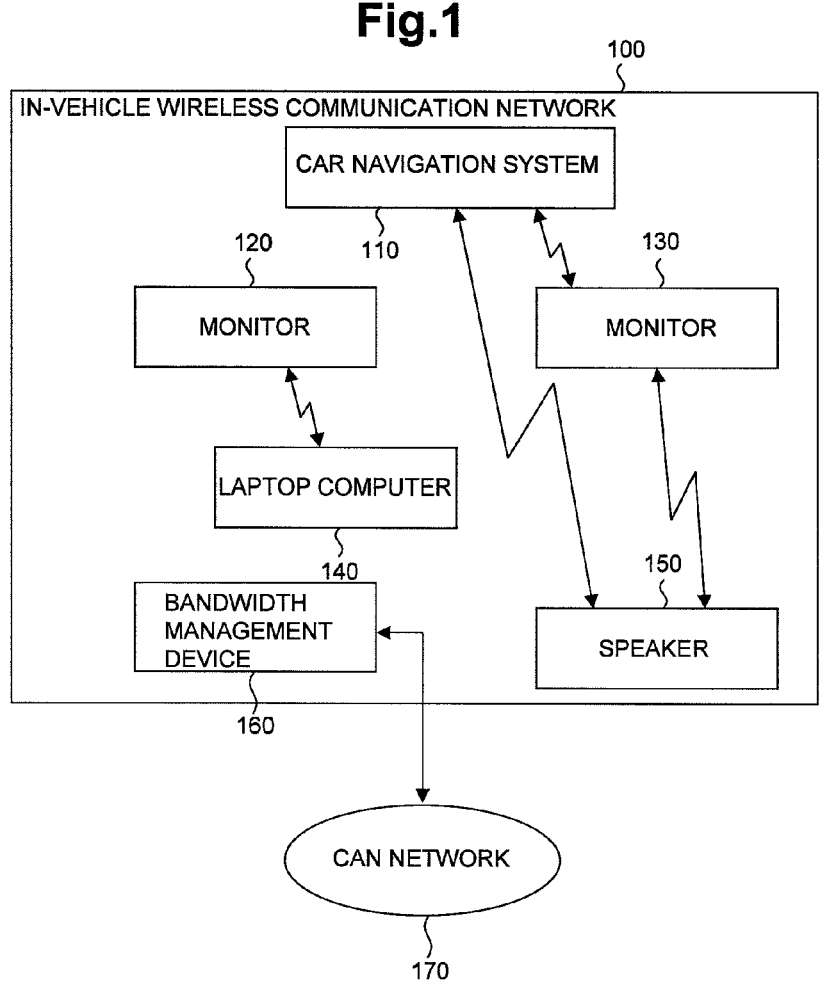
FIG. 1 is a block diagram showing a communication system according to an embodiment of the present invention.

First, a typical embodiment of the invention disclosed in this specification will be outlined below. Each of the reference numerals provided in the attached drawings and inserted, being parenthesized, in the following outline of the embodiment merely denotes an example included in the concept of the constituent element mentioned preceding the reference numeral.

[1]<Dynamic Bandwidth Management>

A data processor (160) according to a typical embodiment of the present invention is for managing bandwidths used by electronic devices (110 to 150) participating in a communication network and includes a wireless communication section (206, 207) which communicates with the electronic devices and a bandwidth management section (202, 208, 215) which performs control to dynamically allocate bandwidths to the electronic devices upon requests from them.

The above data processor enables optimum bandwidth allocation for data communication. For example, even in a case where, upon addition of an electronic device to a communication network, it is found difficult to allocate an adequate bandwidth to the electronic device, allocating an adequate bandwidth to the electronic device may be made possible by requesting another electronic device transmitting video data with a higher resolution than required to meet user's intention to change the data format being used. Thus, the data processor can flexibly set bandwidths for use in a communication network and change the settings.

[2]<Bandwidth Management Table>

In the data processor described in [1], the bandwidth management section includes a bandwidth management table (215) and performs bandwidth allocation control by referring to the information held in the bandwidth management table. The bandwidth management table has fields for holding bandwidth management information for each of the electronic devices. This facilitates information management for bandwidth allocation.

[3]<Initial Management Information>

In the data processor described in [2], when the bandwidth management section recognizes an additional electronic device, it records (406) identification information about the additional electronic device and attribute information about data to be transmitted from the additional electronic device as new entry data in the bandwidth management table. This makes it easy to identify an electronic device newly joining the communication network.

[4]

In the data processor described in [3], the identification information represents a MAC address (220) and the attribute information represents a usable data format (222). The MAC address enables an electronic device to be specifically identified and the usable data format allows a bandwidth required for communication to be determined.

[5]<Beacon Information>

In the data processor described in [4], the information about the MAC address and usable data format is obtained from beacon information (1310, 1320) included in a superframe used for Wireless USB communication. The beacon information enables the data processor to grasp the presence of an electronic device joining the network. Based on the beacon information, the data processor can easily obtain the MAC address of and usable data format for the electronic device.

[6]<Bandwidth>

In the data processor described in [2], the bandwidth is a data bandwidth set in medium access slots.

[7]<Bandwidth Acquisition Command>

In the data processor described in [3], when a bandwidth acquisition command requesting bandwidth acquisition is received from the electronic device, the bandwidth management section determines (810), by referring to the bandwidth management table, whether or not a requested bandwidth can be acquired and requests, as required, another electronic device to change the bandwidth used thereby or discontinue communication being performed thereby (830, 840). When it is determined that the request by the bandwidth acquisition command can be met, the entry data corresponding to the electronic device held in the bandwidth management table is updated to include information on the bandwidth that can be acquired for the electronic device and the destination address for transmission made using the bandwidth (850). When the request cannot be met, the electronic device having issued the bandwidth acquisition command is informed to that effect (860). Thus, receiving and processing bandwidth acquisition commands individually from individual electronic devices makes it possible to variably control bandwidth allocation, so that, even when there is no unused bandwidth available, it may be possible to meet requests for bandwidth acquisition by reducing the bandwidth allocated to another electronic device or by discontinuing the communication being engaged in by another electronic device.

[8]<Bandwidth Acquisition Procedure>

In the data processor described in [7], the bandwidth management section, in determining whether or not a request by a bandwidth acquisition command requesting bandwidth acquisition can be met, proceeds as follows: when there is communication present with priority lower than that of communication to be performed using the bandwidth requested by the bandwidth acquisition command, the bandwidth management section requests the data format used for such lower-priority communication to be changed so as to obtain a bandwidth for allocation to the electronic device having issued the bandwidth acquisition command (702); when there is no such lower-priority communication present, the bandwidth management section requests the electronic device having issued the bandwidth acquisition command to change its own data format (710); when the data format used by the electronic device having issued the bandwidth acquisition command cannot be changed whereas there is communication present with the same priority as that of the communication for which the bandwidth acquisition command has been issued, the bandwidth management section requests the data format used for such same-priority communication to be changed so as to obtain a bandwidth for allocation to the electronic device having issued the bandwidth acquisition command (714); and, when there is no communication present with the same priority as that of the communication for which the bandwidth acquisition command has been issued, the bandwidth management section determines that there is no bandwidth available and informs the electronic device having issued the bandwidth acquisition command to that effect. Even in cases where bandwidths allocated to other electronic devices are reduced or communications engaged in by other electronic devices are discontinued, electronic devices having higher communication priority are less affected by communications engaged in by other electronic devices.

[9]<Details of Bandwidth Acquisition Procedure>

In the data processor described in [8], when there is communication present with priority lower than that of communication to be performed using the bandwidth requested by the bandwidth acquisition command, the bandwidth management section requests the data format used for such lower-priority communication to be changed so as to obtain a bandwidth for allocation to the electronic device having issued the bandwidth acquisition command (702). If a response informing that the data format cannot be changed is received, the bandwidth management section calculates the sum of the bandwidth allocated for a lowest-priority communication and the unused bandwidth and determines whether or not the sum reaches the bandwidth requested by the bandwidth acquisition command. If the sum is determined to reach the requested bandwidth, the bandwidth management section requests the data format used for the lowest-priority communication to be changed so as to obtain a bandwidth for allocation to the electronic device having issued the bandwidth acquisition command. In this way, even when it is necessary to reduce the bandwidth allocated to another electronic device or discontinue the communication engaged in by another electronic device, the effects of such processing on other lower-priority communications can be reduced.

[10]<Details of Bandwidth Acquisition Procedure>

In the data processor described in [8], when there is communication present with the same priority as that of communication to be performed using the bandwidth requested by the bandwidth acquisition command, the bandwidth management section requests the data format for such same-priority communication to be changed so as to obtain a bandwidth for allocation to the electronic device having issued the bandwidth acquisition command (714). Thus, it is possible, when there is no communication present with priority lower than that of the communication to be performed by the electronic device having issued the bandwidth acquisition command, to obtain a required bandwidth by reducing the bandwidth allocated for such same-priority communication.

[11]<Variable Management of Bandwidths>

The communication system according to the typical embodiment of the present invention includes electronic devices which can participate in the communication network together with the data processor described in [7]. Each of the electronic devices includes a communication section which communicates with the data processor and other electronic devices, an interface section which, when a request, made as required by the bandwidth management section of the data processor, for a bandwidth change or communication discontinuation is received, displays the request and to which a response to the request is inputted, and a control section for controlling display at and input to the interface section. Hence it is possible for an electronic device to respond, when a request for a bandwidth reduction or communication discontinuation is received from the data processor so as to allocate a bandwidth to another electronic device, to the request by reflecting the user's intention. This contributes toward realization of a user-friendly communication environment.

[12]<Bandwidth>

In the communication system described in [11], the bandwidth is a data bandwidth set in medium access slots of a superframe used for Wireless USB communication.

2. Further Detailed Description of the Preferred Embodiments

The present embodiment will be described in further detail.

<<Communication System>>

FIG. 1 is a block diagram showing a communication system according to the present embodiment of the invention. The communication system shown is, though not limited to, of a type which allows, by employing plural electronic devices each provided with a near field communication interface such as an UWB interface, direct communications between electronic devices without using any router or hub. An in-vehicle network 100 shown as an example communication system in FIG. 1 includes such electronic devices as a car navigation system 110, a speaker 150, a monitor 130, a laptop computer (personal computer) 140, and a monitor 120. The in-vehicle network 100 configures a network centered around the car navigation system 110 and allows the monitor 120 and the laptop computer 140 to directly communicate with each other without involving the car navigation system 110. It is, therefore, possible to display contents stored in the laptop computer 140 brought in the in-vehicle network 100 on the monitor 120.

Even though the present embodiment will be described based on the in-vehicle network 100 as an example communication system, the invention can be obviously applicable also to other types of communication systems, for example, a home network using an UWB.

The ECMA-368 standard for UWB communication does not define any system for managing bandwidths for use by the devices present in a same network. It is, therefore, necessary to define a bandwidth management system for each communication system application.

In a Wireless USB communication system among applications complying with the ECMA-368 standard, for example, a host device to perform bandwidth management secures a bandwidth for a whole network in advance and, every time an additional device is added to the network, allocates a bandwidth to the additional device. In the bandwidth management performed for Wireless USB communication, however, the host device allocates a bandwidth to the additional device without regard to the minimum bandwidth required by the additional device to engage in data communication. This allows a wider bandwidth than required to be allocated to the additional device, possibly resulting in that another device subsequently added to the network cannot have a bandwidth required to engage in data communication allocated to it. Furthermore, with the host device performing bandwidth allocation only when an additional device is added to the network, the bandwidth allocation in the network cannot be changed dynamically.

To eliminate such problems, the present embodiment uses a network configuration in which a data processor referred to as a bandwidth management device 160 is installed in the in-vehicle network 100. The bandwidth management device 160 is a circuit having a control function for, using information, for example, about the types of electronic devices present in the in-vehicle network 100 and the types and formats of data which can be transmitted by the electronic devices, dynamically managing and monitoring the bandwidths used by the electronic devices present in the in-vehicle network 100. In the present embodiment, the bandwidth management device 160 of the in-vehicle network 100 is coupled to a control area network (CAN) 170 which is an intra-corporation local area network (LAN) so as to enable bandwidth changes depending on the vehicle condition or events occurring in the vehicle, even though the embodiment is not limited to such a configuration. The bandwidth management device 160 will be described in detail below.

Even though the configuration of the present embodiment described below includes the in-vehicle network 100 with the bandwidth management device 160 added to it, an alternative configuration may be used in which the functions of the bandwidth management device 160 are incorporated in an electronic device, for example, the car navigation system 110 having a high-performance CPU and in which the bandwidths for use by the electronic devices included in the in-vehicle network 100 are managed and monitored using the electronic device incorporating the bandwidth management functions. Also, in the present embodiment, data communication in the in-vehicle network 100 makes use of an UWB interface, but an alternative arrangement may be used in which a near field communication interface, for example, ZigBee (registered trademark, hereinafter omitted) or Bluetooth (registered trademark, hereinafter omitted) or a wireless interface such as Wi-Fi (registered trademark, hereinafter omitted) is used.

In the following description, the electronic devices, other than the bandwidth management device 160, present in the in-vehicle network 160 will be, for the sake of convenience, referred to as processing devices.

<<Bandwidth Management Device>>

Figure 2A:
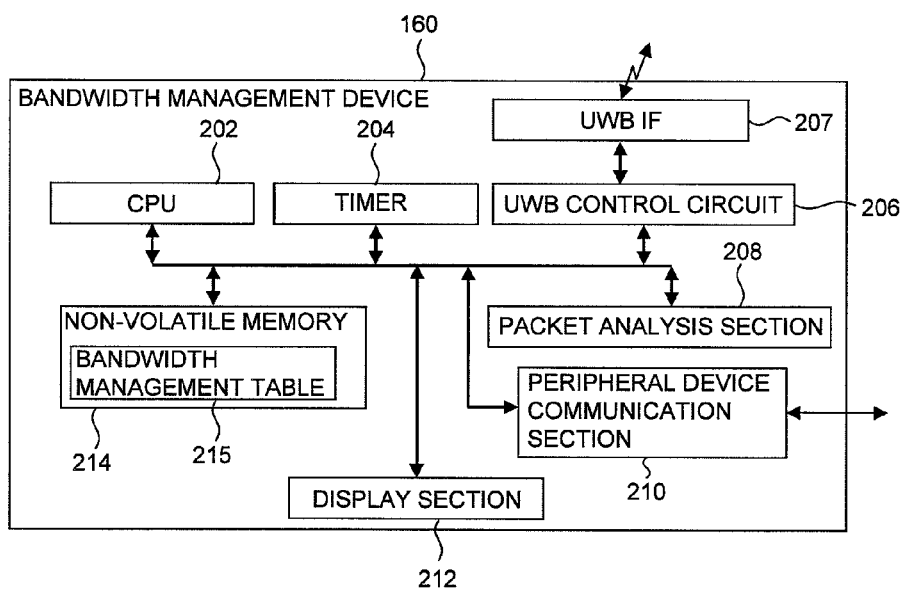
FIG. 2A is a schematic diagram of an internal configuration of a bandwidth management device.

FIG. 2A is a schematic diagram of an internal configuration of the bandwidth management device 160. The bandwidth management device 160 is provided with a central processing unit (CPU) 202, a timer 204, an UWB control circuit 206, an UWB IF 207, a packet analysis section 208, a peripheral device communication section 210, a display section 212, and a non-volatile memory 214. Plural elements such as the CPU 202, timer 204, and non-volatile memory 214 may be incorporated in a large-scale semiconductor integrated circuit (LSI) as a microcontroller formed on a single semiconductor chip. Alternatively, the bandwidth management device 160 as a whole may be configured on a single or plural semiconductor chips.

The timer 204 is used to measure the effective period of the bandwidth allocated to each processing device in the in-vehicle network 100.

The UWB control circuit 206 realizes, via the UWB IF 207, data communication based on the ECMA-368 standard.

Figure 14:
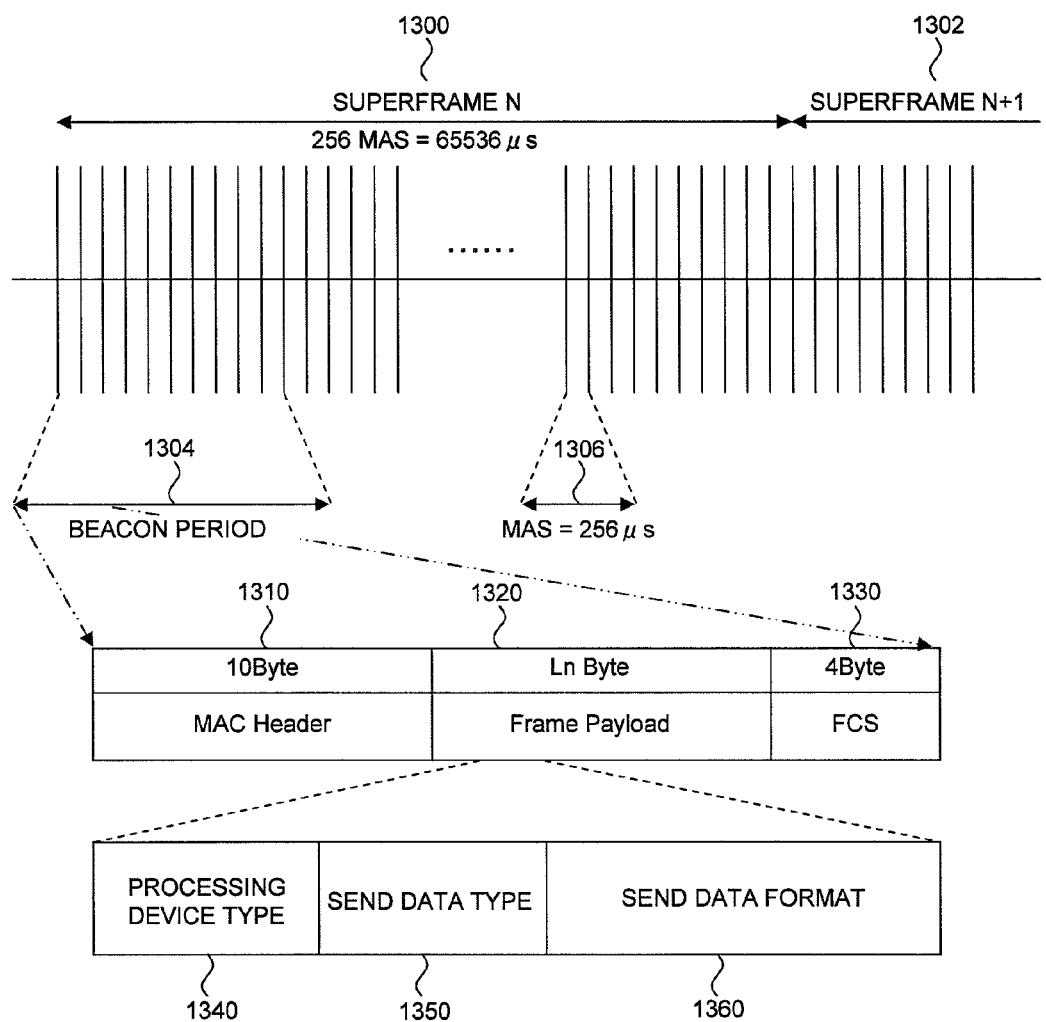
FIG. 14 is an explanatory diagram illustrating a method of UWB-based data communication.

FIG. 14 illustrates an example method of UWB-based data communication. In the ECMA-368 standard, a basic timing structure in which packets each called a superframe 1300 are exchanged is defined. The superframe 1300 includes 256 medium access slots (MASs) 1306 each having a duration of 256 μs. The MASs 1306 make up time slots allocated to individual processing devices present in a same network. The bandwidth allocated to each of the processing devices to engage in communication is set in time slots.

An initial period of the superframe 1300 is used as a beacon period 1304. Each of the processing devices present in the in-vehicle network 100 is required to broadcast a beacon during the beacon period 1304.

A beacon is a packet which, in the in-vehicle network 100, each processing device broadcasts to other processing devices to notify them of its presence in the in-vehicle network 100. Like other kinds of packets, the beacon includes a 10-byte MAC header 1310, a frame payload 1320, and a 4-byte frame check sequence (FCS) 1330. Using the beacon as an example, the structure of a packet will be described below.

The MAC header 1310 holds such information items as packet type, sender MAC address, and destination MAC address. The information items to be set in the MAC header 1310 are defined in the ECMA-368 standard.

The frame payload 1320 holds data to be sent to other processing devices. In the case of a beacon, the frame payload 1320 holds information required when the processing device transmitting the beacon engages in data communication with other processing devices. The frame payload 1320 of a beacon can also hold application-specific information. In the present embodiment, the frame payload 1320 included in each beacon has such application-specific information items as processing device type 1340, send data type 1350, and send data format 1360.

The processing device type 1340 indicates the type of a processing device, for example, a car navigation system, display monitor, or car-mounted camera. The send data type 1350 indicates the type of send data, for example, text data, music data, or video data. The send data format 1360 indicates the type of data format, for example, MPEG-2 or MPEG-4.

The FCS 1330 is an error correcting code.

An example of data communication system using an UWB has been described. The following description is based on the assumption that beacons including such information as processing device type are used. In cases where a network with an interface which, unlike an UWB interface, does not make use of any information structure like the beacon is used, it is necessary to use an alternative arrangement, for example, an arrangement in which, when a processing device is coupled to the network, relevant information such as the processing device type information to be newly included in the beacon is broadcast to the other processing devices present in the network or an arrangement in which, when an additional processing device is added to the network, the bandwidth management device 160 sends an inquiry to the additional processing device about the type of the processing device.

Referring to FIG. 2A, the packet analysis section 208 is a circuit for analyzing packets received via the UWB IF 207. The CPU 202 can analyze packets, but, in UWB communication, it is necessary to periodically receive and analyze beacons, so that making the CPU 202 analyze beacons greatly increases the load on the CPU. Using a special circuit such as the packet analysis section 208 for analyzing periodically received packets such as beacons reduces the load on the CPU 202.

The peripheral device communication section 210 is a circuit for acquiring, via an interface other than the UWB IF 207, information about environment outside the in-vehicle network 100 (hereinafter referred to as "external environmental information"). It is possible to obtain information, for example, about the operating condition of an engine or brake via the CAN network 170 or a wired interface such as FlexRay (registered trademark, hereinafter omitted).

The display section 212 is a circuit module for informing the user about the current condition of the in-vehicle network 100 and includes, for example, a display controller and a display.

The non-volatile memory 214 is a memory like an EEPROM or a flash memory. The bandwidth management table 215 that the bandwidth management device 160 uses to manage and monitor the bandwidths allocated to the processing devices present in the in-vehicle network 100 is stored in the non-volatile memory 214.

The bandwidth management table 215 has a storage area for storing, for each processing device, information used for bandwidth management. As shown in FIG. 2B, the bandwidth management table 215 is structured to hold, for each processing device, such information items as sender MAC address 220, type 221, usable format 222, destination MAC address 223, requested bandwidth 224, acquired bandwidth 225, requested format 226, acquired format 227, bandwidth secured period 228, and priority 229.

A MAC address is an address to uniquely identify a processing device. How to obtain a MAC address depends on the interface used. When the UWB IF 207 is used, the beacon periodically broadcast by each processing device provided with the UWB IF 207 includes the MAC address of the processing device.

The sender MAC address 220 holds the MAC address of each processing device present in the in-vehicle network 100 obtained from the corresponding beacon.

The type 221 indicates the type of the processing device represented by each sender MAC address 220. The value set in the type 221 is the same as the value set in the processing device type 1340 included in the beacon transmitted by the processing device.

The destination MAC address 223 holds the MAC address of each processing device with which the processing device represented by the sender MAC address 220 communicates.

The usable format 222 indicates the data format that can be used for transmission by the processing device represented by the sender MAC address 220. The value set in the usable format 222 is the same as the value set in the send data format 1360 included in the beacon transmitted by the processing device.

The requested bandwidth 224 indicates the bandwidth that the processing device represented by the sender MAC address 220 requests the bandwidth management device 160 to allocate for data communication to be made via the UWB IF with the processing device represented by the corresponding destination MAC address 223. The value set in the requested bandwidth 224 may represent, for example, a data transmission speed or the number of MASs 1306.

The acquired bandwidth 225 indicates the bandwidth notified by the bandwidth management device 160 in response to the request made by the sender processing device.

The requested format 226 indicates the data format that the processing device represented by the sender MAC address 220 requests the bandwidth management device 160 to allocate for data communication to be made via the UWB IF with the processing device represented by the corresponding destination MAC address 223.

The acquired format 227 indicates the format notified by the bandwidth management device 160 in response to the request made by the sender processing device.

The bandwidth secured period 228 indicates the period during which the processing device represented by the sender MAC address 220 can engage in data communication with the processing device represented by the destination MAC address 223 using the acquired bandwidth 225 and the acquired format 227. The bandwidth secured period need not necessarily match the corresponding requested bandwidth period.

The priority 229 indicates the priority calculated by the CPU 202 based on the external environmental information and user's intention acquired through the peripheral device communication section 210. The priority is determined such that when, for example, the CPU 202 is informed of gear shifting to R (reverse) via the peripheral device communication section 210, the priority of the data communication between a car-mounted camera for shooting a behind-the-car view and a car navigation system or display monitor is raised.

The user's intention is a value determined based on a value set by the user in advance using the display section 212 and an item selected by the user using the in-vehicle network 100.

Though not shown in FIG. 2B, the bandwidth management table 215 may also has such information items as "channel being used" and "time slot being used" respectively representing the channel and time slot being used for data communication between the processing device represented by the sender MAC address 220 and the processing device represented by the destination MAC address 223.

<<Processing Device>>

Figures 3A, 3B:
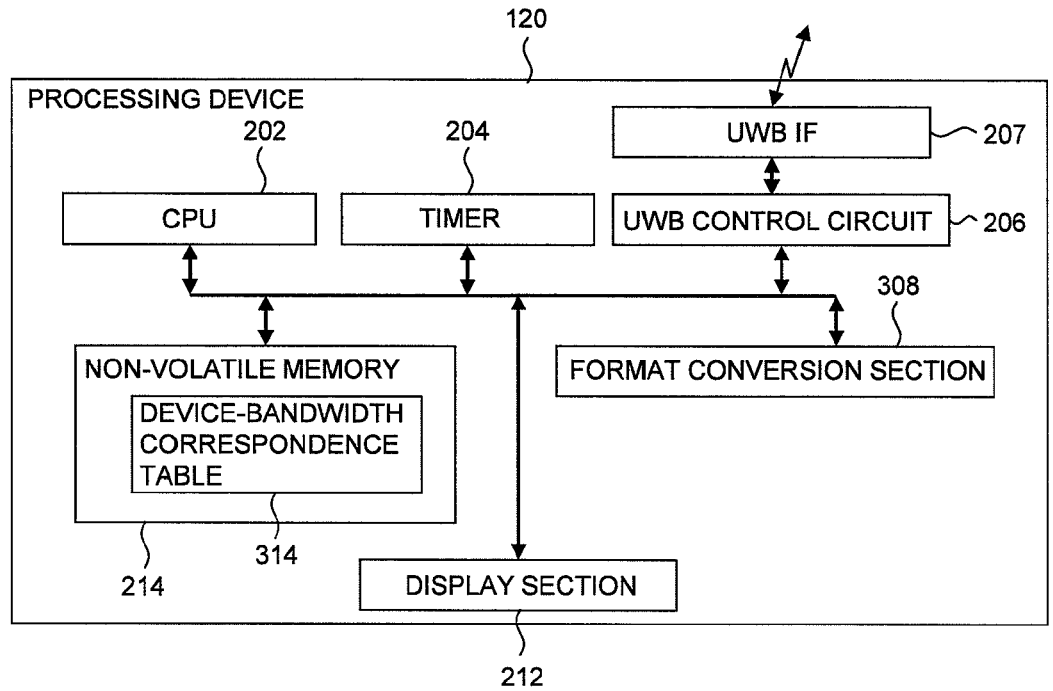
FIG. 3A is a block diagram showing an internal configuration of a processing device to be a target of bandwidth management and monitoring by the bandwidth management device.
FIG. 3B is an explanatory diagram showing example information stored in a device-bandwidth correspondence table.

FIG. 3A shows an example internal configuration of a processing device 120 to be a target of bandwidth management and monitoring by the bandwidth management device 160.

The processing device 120 has, like the bandwidth management device 160, a CPU 302, a timer 304, an UWB control circuit 306, an UWB IF 307, a display section 312, and a non-volatile memory 314. Unlike the bandwidth management device 160, the processing device 120 also has a format conversion section 308. There are cases in which a request for changing the data format being used in data communication is transmitted from the bandwidth management device 160. The format conversion section 308 is a circuit for converting the data format when such a request is received.

The non-volatile memory 314 stores a device-bandwidth correspondence table 314 which, as shown in FIG. 3B, provides correspondence between the processing device to engage in data communication and bandwidths and data formats that can be used for data communication with other processing devices. The device-bandwidth correspondence table 314 has fields for such information items as sender MAC address 320, usable bandwidth 321, usable format 322, usable channel 323, usable slot 324, and bandwidth retainable period 325. The information items of the device-bandwidth correspondence table 314 are set when the processing device 120 inquires the bandwidth management device 160 about the corresponding information when starting data communication.

In the present embodiment, the bandwidth management device 160 can allocate, by grasping the type of data to be transmitted and the data format to be used by each processing device present in the in-vehicle network 100, an optimum bandwidth to each processing device and can dynamically change the bandwidth allocation to each processing device by changing the type of data transmitted and the data format used by each processing device according to external environmental information and each user's intention. For this, the bandwidth management device 160 includes an arrangement for dynamically changing the bandwidth allocation to each processing device present in the in-vehicle network 100. The arrangement will be described below.

Figure 4:
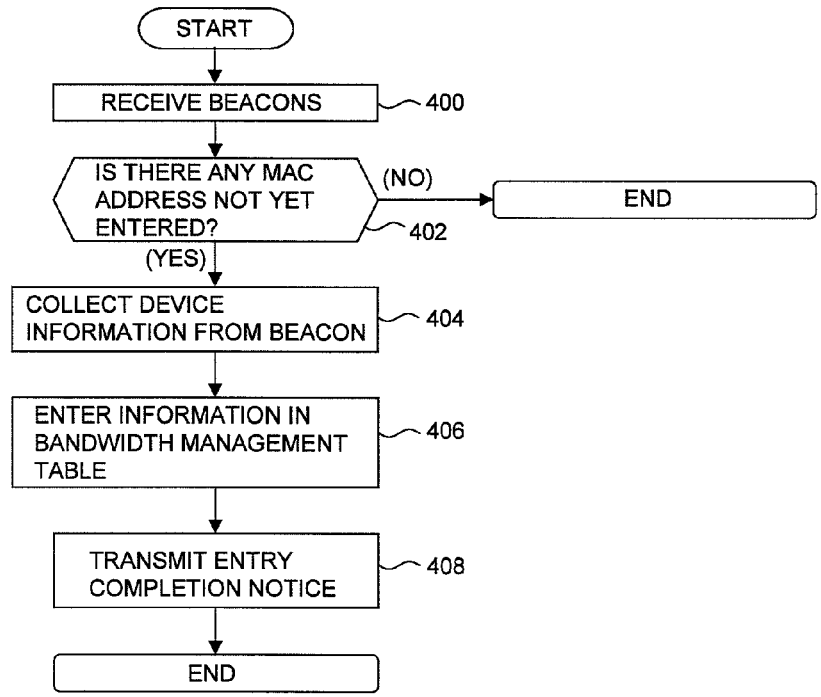
FIG. 4 is a flowchart showing a processing sequence performed by the bandwidth management device when a newly added processing device is present in an in-vehicle network.

FIG. 4 shows a processing sequence followed by the bandwidth management device 160 when a newly added processing device is present in the in-vehicle network 100.

The bandwidth management device 160 receives, in the beacon period 1304 shown in FIG. 14, the beacons broadcast by the processing devices present in the in-vehicle network 100 and analyzes the received beacons at the packet analysis section 208 (step 400). When, as a result, the sender MAC addresses read from the beacons are found to be those set in the bandwidth management table 215, it is determined that there is no newly added processing device in the in-vehicle network 100.

When, conversely, any of the sender MAC addresses read from the beacons is found to be one not set in the bandwidth management table 215, it is determined that there is a newly added processing device in the in-vehicle network 100 and the bandwidth management device 160 proceeds to the subsequent processing sequence (step 402).

<<Processing for Entry in Bandwidth Management Table>>

When the bandwidth management device 160 recognizes a newly added processing device in the in-vehicle network 100, the device information contained in the beacon received from the newly added processing device is analyzed and entered in the bandwidth management table 215 by the packet analysis section 208 (steps 404, 406). The device information collected in step 404 includes the device type 1340, send data type 1350, and send data format 1360 shown in FIG. 14. The information items entered, in step 406, in the bandwidth management table 215 includes the sender MAC address 220, type 221, and usable data format 222.

When the information entry in the bandwidth management table 215 is completed, an entry completion notice is sent, in step 408, to the newly added processing device. If any of the device type 1340, send data type 1350, and send data format 1360 is missing in the beacon broadcast by the newly added processing device, the bandwidth management device 160 may send a request for the missing information to the newly added processing device. If the request is not complied with, i.e. if the newly added processing device does not transmit the information required to complete the information entry, the bandwidth management device 160 may regard the processing device as not being present in the in-vehicle network 100 and completely remove the information about the processing device already entered in the bandwidth management table 215. Though not shown in FIG. 4, when the MAC address corresponding to the sender MAC address 220 held in the bandwidth management table 215 cannot be collected from the MAC header 1310 of the beacon information, the existing information associated with the MAC address is nullified or deleted from the bandwidth management table 215 so as to remove unrequired entries.

The processing sequence performed by the bandwidth management device 160 when a newly added processing device is present in the in-vehicle network 100 has been described above.

<<Processing for Responding to Bandwidth Acquisition Command>>

Figure 5:
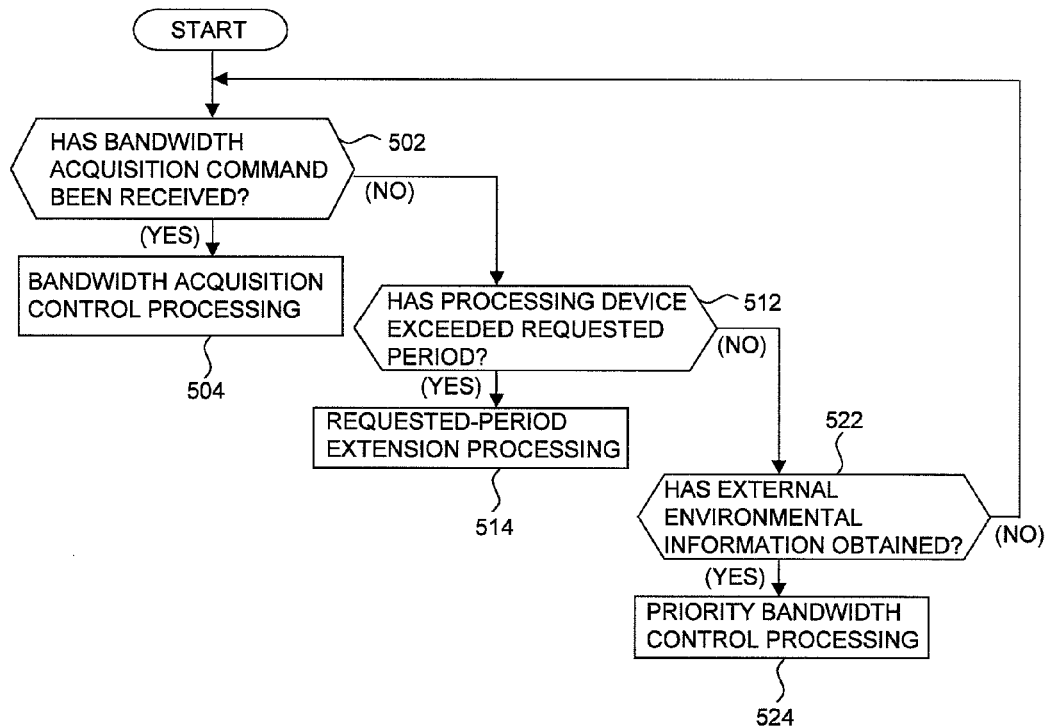
FIG. 5 is a flowchart showing a normal processing sequence performed by the bandwidth management device.

FIG. 5 shows a normal processing sequence performed by the bandwidth management device 160. In cases where the functions of the bandwidth management device 160 are incorporated in a processing device such as a car navigation system, it is necessary to execute an operating sequence for realizing the functions of the processing device in addition to the processing sequence shown in FIG. 5.

When a bandwidth acquisition command is received, step 502, from a processing device present in the in-vehicle network 100, the bandwidth management device 160 performs bandwidth acquisition control processing (step 504).

FIG. 6 shows a processing sequence for bandwidth acquisition control.

When a bandwidth acquisition command is received, the bandwidth management device 160 analyzes, in step 600, the bandwidth acquisition command using the packet analysis section 208. The bandwidth acquisition command contains such information as the destination MAC address and the bandwidth, send data format and bandwidth secured period desired by the processing device having issued the bandwidth acquisition command.

In step 600 in which the contents of the bandwidth acquisition command received are analyzed, communication priority calculation is also made based on the external environmental information acquired from the peripheral device communication section 210 and the user's intention that has been set in advance.

After the bandwidth acquisition command received is analyzed, the CPU 202 refers to the bandwidth management table 215 in step 610 and determines, in step 620, whether or not the required bandwidth can be acquired.

When it is determined in step 620 that the required bandwidth can be acquired, the CPU 202 updates, in step 630, the relevant items in the bandwidth management table 215 and transmits, in step 640, a bandwidth acquisition completion notice to the processing device having issued the bandwidth acquisition command. The bandwidth acquisition completion notice contains information about the channel and slot available to the processing device having issued the bandwidth acquisition command. Based on such information, the processing device updates the device-bandwidth correspondence table 316 and performs data communication.

When it is determined in step 620 that the required bandwidth cannot be acquired, the CPU 202 proceeds to perform bandwidth acquisition processing (step 650).

FIG. 7 shows a concrete processing sequence for the bandwidth acquisition processing (step 650).

First, the CPU 202 determines in step 701 whether or not there is data communication present with lower priority than the priority calculated in step 600.

When it is determined in step 701 that such lower-priority data communication is present, the CPU 202 determines in step 702, by referring to the usable format 222 in the bandwidth management table 215, whether or not the data format used for the lowest-priority data communication out of all lower-priority data communications can be changed.

When it is determined in step 702 that the data format can be changed, the CPU 202 calculates, in step 703, the sum of the bandwidth made available by changing the data format and the currently unused bandwidth.

When it is determined in step 702 that the data format cannot be changed, the CPU 202 calculates, in step 704, the sum of the bandwidth being used for the lowest-priority data communication and the currently unused bandwidth.

Based on the total bandwidth calculated in step 703 or 704, the CPU 202 determines, in step 705, whether or not the data communication desired by the processing device having issued the bandwidth acquisition command can be performed.

When it is determined in step 705 that the desired data communication can be performed, the CPU 202 advances to step 720 to perform the subsequent processing sequence. The processing sequence beginning with step 720 will be described later.

When it is determined in step 705 that the desired data communication cannot be performed, the CPU 202 determines in step 706 whether or not there is data communication present with the next lowest priority.

When it is determined in step 706 that data communication with the next lowest priority is present, the CPU 202 determines in step 707, by referring to the usable format 222 in the bandwidth management table 215, whether or not the data format used for the data communication with the next lowest priority can be changed.

When it is determined in step 707 that the data format can be changed, the CPU 202 calculates, in step 708, the sum of the bandwidth made available by changing the data format and the currently unused bandwidth. The bandwidth made available by changing the data format is inclusive of the bandwidth made available in step 703 or 704.

When it is determined in step 707 that the data format cannot be changed, the CPU 202 calculates in step 708 the sum of the bandwidth being used for the data communication with the next lowest priority and the currently unused bandwidth. The bandwidth being used for the data communication with the next lowest priority is inclusive of the bandwidth made available in step 703 or 704.

Based on the total bandwidth calculated in step 708 or 709, the CPU 202 determines in step 705 whether or not the data communication desired by the processing device having issued the bandwidth acquisition command can be performed.

When it is determined in step 705 that the desired data communication cannot be performed, the CPU 202 proceeds to repeat the processing sequence of steps 706 to 709 as long as there is data communication present with lower priority than the priority of the desired data communication. When there is no more such lower-priority data communication present, the CPU 202 advances to step 710 and performs the subsequent processing sequence. In cases where changing the data format does not make the desired data communication performable, the CPU 202 may acquire a required bandwidth not by changing the data format but by advancing from step 709 to step 705 and discontinuing lower-priority data communication.

When, as a result of processing from step 702 through step 709, it becomes possible to perform the desired data communication, the CPU 202 determines in step 720, as shown in FIG. 8A, whether or not it is necessary to discontinue the data communication performed with lower priority than the priority of the desired data communication. When it is necessary to discontinue the lower-priority data communication, the CPU 202 transmits, in step 721, a data communication discontinuation command to the processing device engaged in the lower-priority data communication.

Next, the CPU 202 determines in step 722 whether or not it is necessary to change the data format used for the lower-priority data communication. When it is necessary to change the data format used for the lower-priority data communication, the CPU 202 transmits, in step 723, a format change command to the processing device engaged in the lower-priority data communication. The CPU 202 updates, in step 724, the bandwidth management table 215 according to the results of processing of steps 720 to 723, then ends the bandwidth acquisition processing of step 650.

The commands exchanged between processing devices during steps 720 and 724 will be described in detail later.

The processing sequence performed in cases where there is no data communication present with priority lower than that of the desired data communication or where, even though there is such lower-priority data communication present, the bandwidth required for the desired data communication cannot be acquired will be described below.

In the above cases, the CPU 202 determines in step 710, as shown in FIG. 7, whether or not the data format for the desired data communication itself can be changed.

When it is determined that the data format for the desired data communication itself can be changed, the CPU 202 calculates, in step 711, the sum of the bandwidth made available by changing the data format and the currently unused bandwidth. In this case, if there is data communication present with priority lower than that of the desired data communication, the bandwidth made available by changing the data format is inclusive of the bandwidths made available in step 703 or 704 and in step 708 or 709.

The CPU 202 determines in step 712 whether or not the desired data communication can be made performable based on the total bandwidth calculated in step 711. When it is determined in step 712 that the desired data communication can be performed, the CPU 202 advances to step 730 and performs the subsequent processing sequence. The processing sequence beginning with step 730 will be described later.

When it is determined in step 712 that the desired data communication cannot be performed, the CPU 202 determines in step 713 whether or not there is data communication present with the same priority as that of the desired data communication.

When it is determined in step 713 that there is no data communication present with the same priority as that of the desired data communication, the CPU 202 determines that the bandwidth required for the desired data communication cannot be acquired. The CPU 202 then transmits in step 740, as shown in FIG. 8C, a data communication rejection command to the processing device having issued the bandwidth acquisition command and ends the bandwidth acquisition processing of step 650.

When it is determined in step 713 that there is data communication present with the same priority as that of the desired data communication, the CPU 202 determines in step 714 whether or not the data format used for the data communication with the same priority can be changed. When, as a result, it is determined that the data format cannot be changed, the CPU 202 determines that the bandwidth required for the desired data communication cannot be acquired. The CPU 202 then transmits in step 740 a data communication rejection command to the processing device having issued the bandwidth acquisition command and ends the bandwidth acquisition processing of step 650.

When it is determined in step 714 that the data format can be changed, the CPU 202 calculates in step 715 the sum of the bandwidth made available by changing the data format and the currently unused bandwidth. In this case, if there is data communication present with priority lower than that of the desired data communication, the bandwidth made available by changing the data format is inclusive of the bandwidths made available in step 703 or 704, in step 708 or 709 and in step 711.

The CPU 202 determines in step 716 whether or not the desired data communication can be made performable based on the total bandwidth calculated in step 715. When it is determined in step 716 that the desired data communication can be performed, the CPU 202 advances to step 730 and performs the subsequent processing sequence. The processing sequence beginning with step 730 will be described later.

When it is determined in step 716 that the desired data communication cannot be performed, the CPU 202 determines that the bandwidth required for the desired data communication cannot be acquired. The CPU 202 then transmits in step 740, as shown in FIG. 8C, a data communication rejection command to the processing device having issued the bandwidth acquisition command and ends the bandwidth acquisition processing of step 650.

The processing sequence performed when it is determined in step 712 or 716 that the desired data communication can be performed will be described below.

Figure 8B:
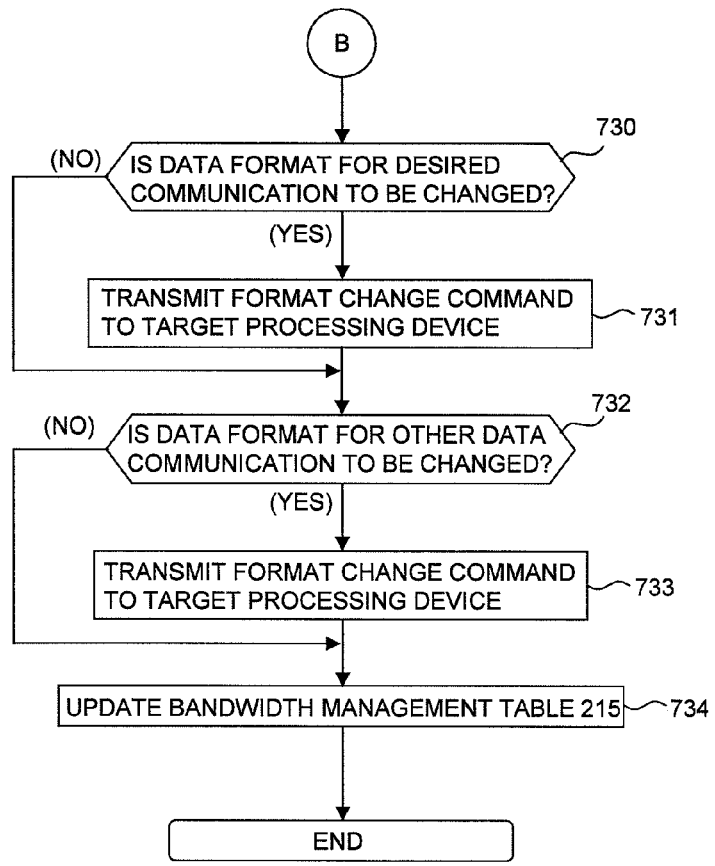
FIG. 8B is a flowchart showing a processing sequence continued from B marked in FIG. 7.
Figure 8C:
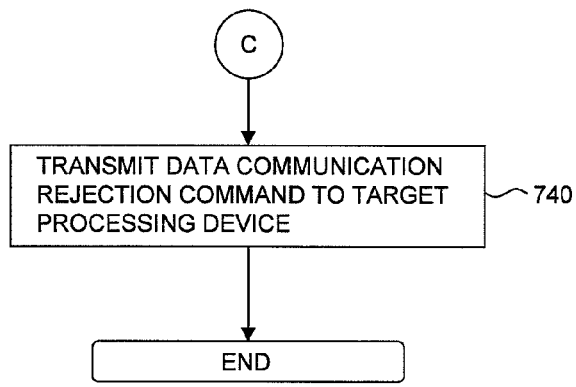
FIG. 8C is a flowchart showing a processing sequence continued from C marked in FIG. 7.

When it is determined that the desired data communication can be performed, the CPU 202 determines in step 730, as shown in FIG. 8B, whether or not it is necessary to change the data format for the desired data communication. When it is determined in step 730 that it is necessary to change the data format for the desired data communication, the CPU 202 transmits in step 731 a format change command to the processing device having issued the bandwidth acquisition command.

Next, in step 732, the CPU 202 determines whether or not it is necessary to change the data format used for data communication other than the desired data communication. When it is determined necessary in step 732, the CPU 202 transmits in step 733 a format change command to the relevant processing device.

The CPU 202 updates, in step 734, the bandwidth management table 215 according to the results of processing of steps 730 to 733, then ends the bandwidth acquisition processing of step 650.

With reference to FIG. 9, the commands exchanged between processing devices during the bandwidth acquisition processing (step 650) will be described below.

In FIG. 9, reference numeral 801 denotes a processing device which transmits a bandwidth acquisition command to the bandwidth management device 160; reference numeral 802 denotes a processing device to which, while it is engaged in data communication with another processing device, a format change command is transmitted from the bandwidth management device 160; and reference numeral 803 denotes a processing device to which, while it is engaged in data communication with another processing device, a data communication discontinuation command is transmitted from the bandwidth management device 160.

Also in FIG. 9, each solid line represents command transmission and each broken line represents a response to a command.

When a bandwidth acquisition command is received from the processing device 801 requesting bandwidth acquisition, the bandwidth management device 160 determines in step 810, via steps 600 and 610, whether or not the bandwidth required for the desired data communication can be acquired. When it is determined that the bandwidth required for the desired data communication can be acquired, the bandwidth management device 160 transmits a bandwidth acquisition completion notice to the processing device 801 as a response to the bandwidth acquisition command.

When it is determined in step 810 that the bandwidth required for the desired data communication cannot be acquired, the bandwidth management device 160 performs the bandwidth acquisition processing (step 650). In the bandwidth acquisition processing (step 650), in cases where, among data communications being performed by processing devices other than the processing device 801 included in the in-vehicle network 100, there is data communication using the data format to be changed for priority arrangement, the bandwidth management device 160 transmits in step 830 a format change command to the relevant processing device 802.

In the bandwidth acquisition processing (step 650), in cases where, among data communications being performed by processing devices other than the processing device 801 included in the in-vehicle network 100, there is data communication present to be discontinued for priority arrangement, the bandwidth management device 160 transmits in step 840 a data communication discontinuation command to the relevant processing device 803.

Figure 10:
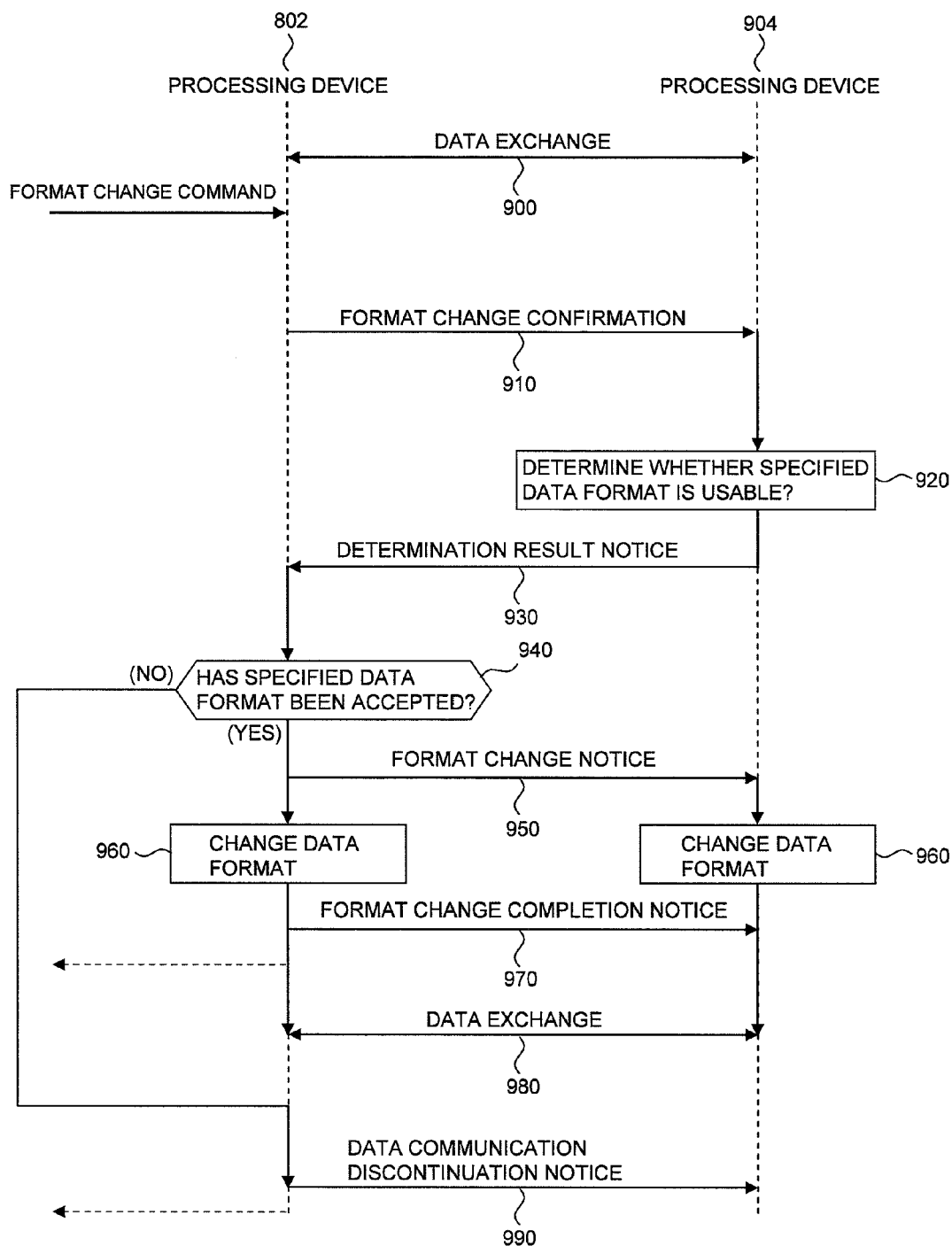
FIG. 10 is a flowchart showing a processing sequence performed by a processing device after receiving a format change command or data communication discontinuation command.

The processing sequence to be performed by a processing device, i.e. the processing device 802 or 803, after receiving a format change command or data communication discontinuation command will be described with reference to FIG. 10. In FIG. 10, reference numeral 904 denotes a processing device engaged in data communication with the processing device 802 or 803.

When, during data communication, a format change command transmitted by the bandwidth management device 160 is received, the processing device 802 transmits in step 910 a format change confirmation command to the processing device 904 to determine whether or not the processing device 904 can use the data format specified by the bandwidth management device 160.

When the format change confirmation command is received, the processing device 904 determines in step 920 whether or not it can change to the specified data format and transmits in step 930 a notice of the determined result to the processing device 802.

When, based on the notice received from the processing device 904, the processing device 802 determines in step 940 that the processing device 904 can use the data format specified by the bandwidth management device 160, the processing device 802 transmits in step 950 a format change notice to the processing device 904 to notify the processing device 904 of when to change the data format. The format change notice contains such information as the format changing time and the numbers of packets and MASs used before the format is changed.

When the format change notice is received, the processing device 904 changes the data format using the format conversion section 308, transmits in step 970 a format change completion notice to the processing device 802 as a response to the format change notice, and starts in step 980 data communication using the data format changed to.

In cases where the processing device 904 cannot use the data format specified by the bandwidth management device 160, the processing device 802 transmits in step 990 a data communication discontinuation notice to the processing device 904 and ends the data communication.

In the case of the processing device 803, the processing sequence to be performed includes step 990 only.

When the processing for a format change or data communication discontinuation is finished, the processing device 802 or 803 transmits the result of the processing to the bandwidth management device 160 as a response to the format change command.

Referring to FIG. 9, the processing devices 802 and 803 each incorporate an arrangement in which, when a format change command or data communication discontinuation command is received, a corresponding display appears on the display section 312 to inform the user of the requested format change or data communication discontinuation. The display section 312 has, though not limited to, a touch panel layer forming an input interface through which the user can input a response as to whether or not to accept the requested format change or data communication discontinuation. Step 870 shown in FIG. 9 represents a typical example of sequence in which receipt of a format change request is displayed and a response as to whether or not to accept the request is inputted by the user. Similarly, step 880 represents a typical example of sequence in which receipt of a data communication discontinuation request is displayed and a response as to whether or not to accept the request is inputted by the user. When the CPU 302 determines, based on the response inputted by the user, the request for a format change or data communication discontinuation has been rejected, the CPU 302 transmits a rejection report, as a response to the format change command, to the bandwidth management device 160. When such a rejection report is received, the bandwidth management device 160 raises the priority of the data communication in favor of which the user rejected the request for a data format change or communication discontinuation and proceeds to perform the bandwidth acquisition processing (step 650) again.

Next, when it is necessary to change the data format for the data communication to be performed by the processing device 801 that issued the bandwidth acquisition command, the bandwidth management device 160 transmits in step 850 a format change notice as a response to the bandwidth acquisition command to the processing device 801.

The bandwidth management device 160, when the data communication to be performed by the processing device 801 that issued the bandwidth acquisition command cannot be performed, transmits in step 860 a data communication rejection notice as a response to the bandwidth acquisition command to the processing device 801. The bandwidth acquisition control processing (step 504) is performed as described above.

Referring to FIG. 5, when it is determined in step 512 that a processing device has exceeded the corresponding bandwidth secured period 228 set in the bandwidth management table 215, the bandwidth management device 160 performs requested-period extension processing (step 514).

<<Requested-Period Extension Processing>>

Figure 11:
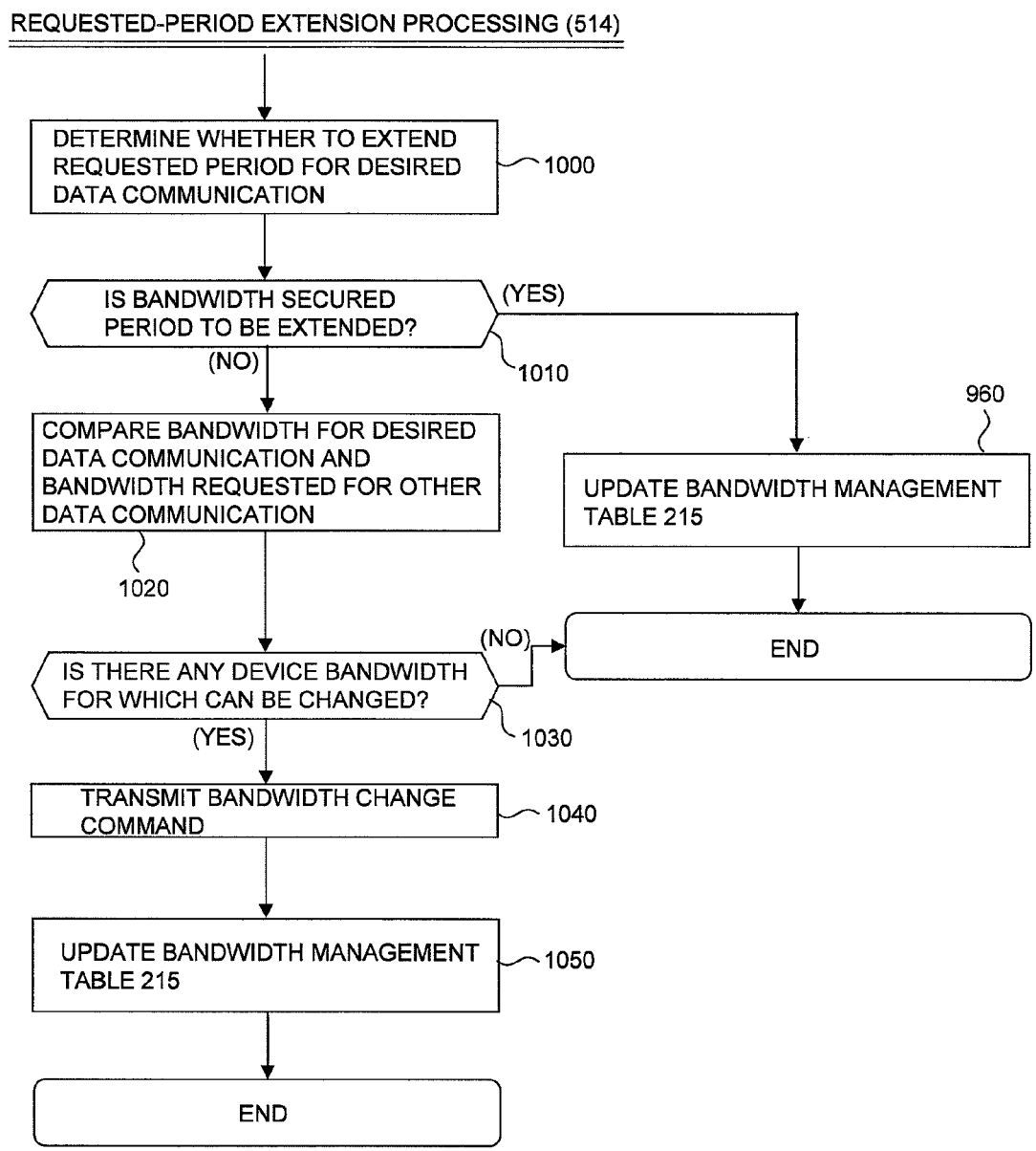
FIG. 11 is a flowchart showing a processing sequence for a requested-period extension.

FIG. 11 shows a processing sequence for the requested-period extension processing (step 514). When the duration of data communication performed by a processing device exceeds the corresponding bandwidth secured period 228, the bandwidth management device 160 requests, in step 1000, the processing device to confirm whether or not the bandwidth secured period is to be extended. For example, the bandwidth management device 160 requests, in step 1010, the user of the processing device to input, from the display section 312 of the processing device, a response as to whether or not to extend the bandwidth secured period. When, as a result, it is determined to extend the bandwidth secured period, the bandwidth management device 160 updates the bandwidth management table 215 and ends, in step 1060, the requested-period extension processing of step 514.

When, as a result, it is determined not to extend the bandwidth secured period, the bandwidth management device 160 compares in step 1020, by referring to the bandwidth management table 215, the requested bandwidth and the bandwidth being used for each data communication to check if there are data communications present for which the requested bandwidth and the bandwidth being used do not match.

When, as a result, it is determined that there is no data communication for which the requested bandwidth and the bandwidth being used do not match, no bandwidth change is required, so that the requested-period extension processing (step 514) is ended.

When it is determined in step 1020 that there are data communications for which the requested bandwidth and the bandwidth being used do not match, the CPU 202 checks, in step 1030, such data communications sequentially in order of priority to see if the sum of the bandwidth being used for any of such data communications beyond the corresponding bandwidth secured period 228 and the currently unused bandwidth can meet the bandwidth requirement for the desired data communication.

When it is determined in step 1030 that none of such data communications can cause, based on the total bandwidth calculated as stated above, the bandwidth requirement of the desired data communication to be met, no bandwidth change is possible, so that the requested-period extension processing (step 514) is ended.

When it is determined in step 1030 that, among such data communications, there is data communication which can cause, based on the total bandwidth as stated above, the bandwidth requirement of the desired data communication to be met, information about the data format usable for the requested bandwidth is extracted from the usable format 222 in the bandwidth management table 215 and a format change command is transmitted, in step 1040, to the relevant processing device.

When the format change command is received, the processing device performs a processing sequence similar to the processing sequence of steps 910 to 980 described with reference to FIG. 10. After receiving a response to the format change command, the bandwidth management device 160 updates the bandwidth management table 215 and ends the requested-period extension processing of step 514. The requested-period extension processing (step 514) has been described above.

Referring to FIG. 5, after receiving, in step 522, external environmental information from the peripheral device communication section 210 and information about the user's intention from the display section 212, the bandwidth management device 160 performs priority bandwidth control processing (step 524).

<<Priority Bandwidth Control Processing>>

Figure 12:
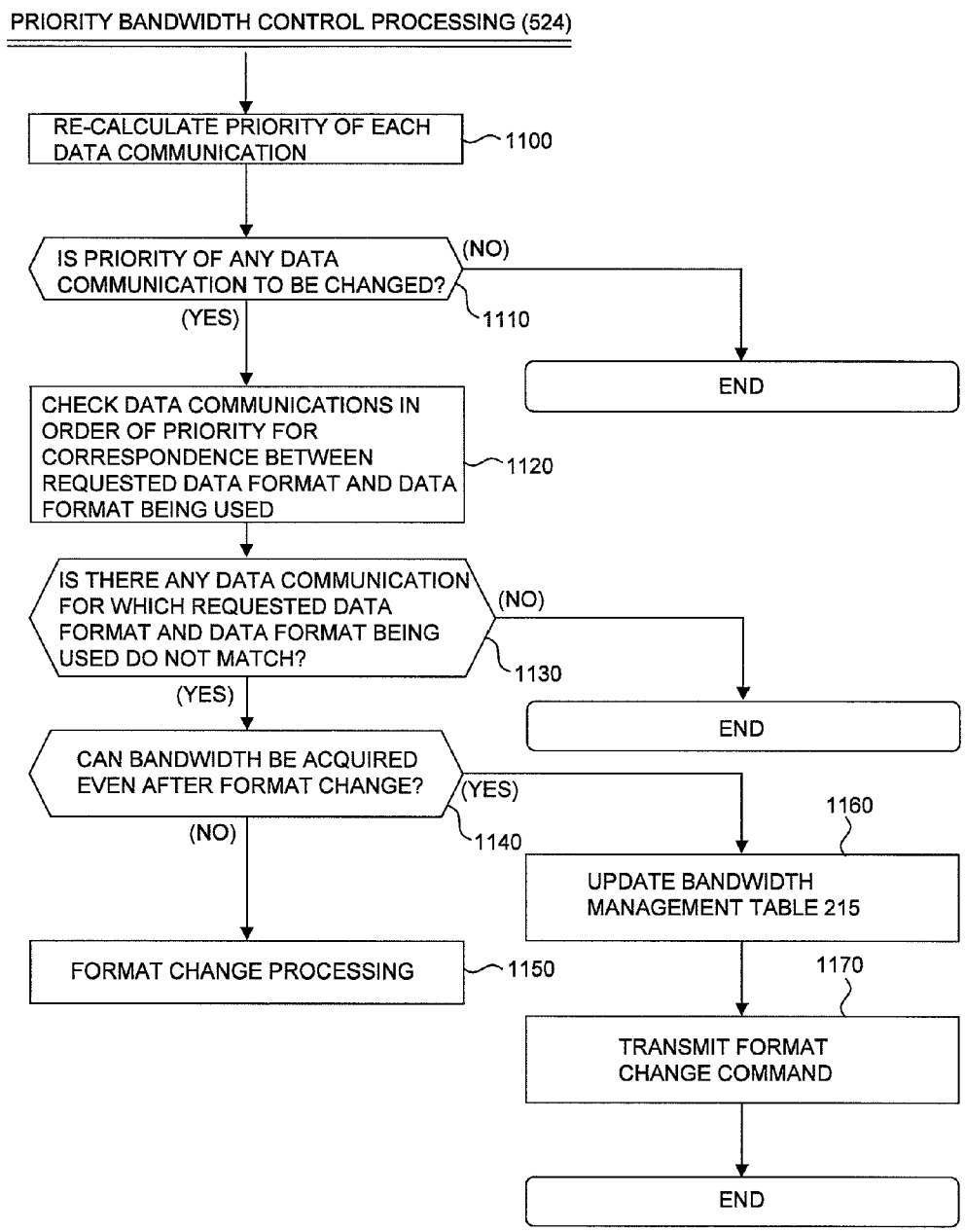
FIG. 12 is a flowchart showing a processing sequence for priority bandwidth control.

FIG. 12 shows a processing sequence for the priority bandwidth control processing (step 524).

After receiving external environmental information and information about the user's intention, the bandwidth management device 160 re-calculates, in step 1100, the priority of each data communication. When the re-calculation results in no priority change, the bandwidth management device 160 ends, in step 1110, the priority bandwidth control processing of step 524.

When the re-calculation results in one or more priority changes, the bandwidth management device 160 checks, in step 1120, all data communications sequentially in order of priority for the correspondence between the requested bandwidth and the bandwidth being used.

When, as a result, the requested bandwidth and the bandwidth being used match for every data communication, the bandwidth management device 160 ends, in step 1130, the priority bandwidth control processing of step 524.

When, as a result of checking in step 1120, it is determined that there is data communication present for which the requested bandwidth and the bandwidth being used do not match, whether or not the bandwidth required for such data communication can be acquired even if the bandwidth being used is changed to the requested bandwidth is determined in step 1140. When, as a result, it is determined that the requested bandwidth can be acquired, information about the data format usable for the requested bandwidth is extracted from the usable format 222 in the bandwidth management table 215 and a format change command is transmitted, in step 1160, to the relevant processing device. The processing sequence performed by the processing device that has received the format change command will not be described here as it is similar to the processing sequence of steps 910 to 980. After receiving a response to the format change command, the bandwidth management device 160 updates the bandwidth management table 215 and ends, in step 1170, the priority bandwidth control processing of step 524.

When, as a result of step 1140, it is determined that the required bandwidth cannot be acquired, the bandwidth management device 160 performs format change processing (step 1150).

Figure 13:
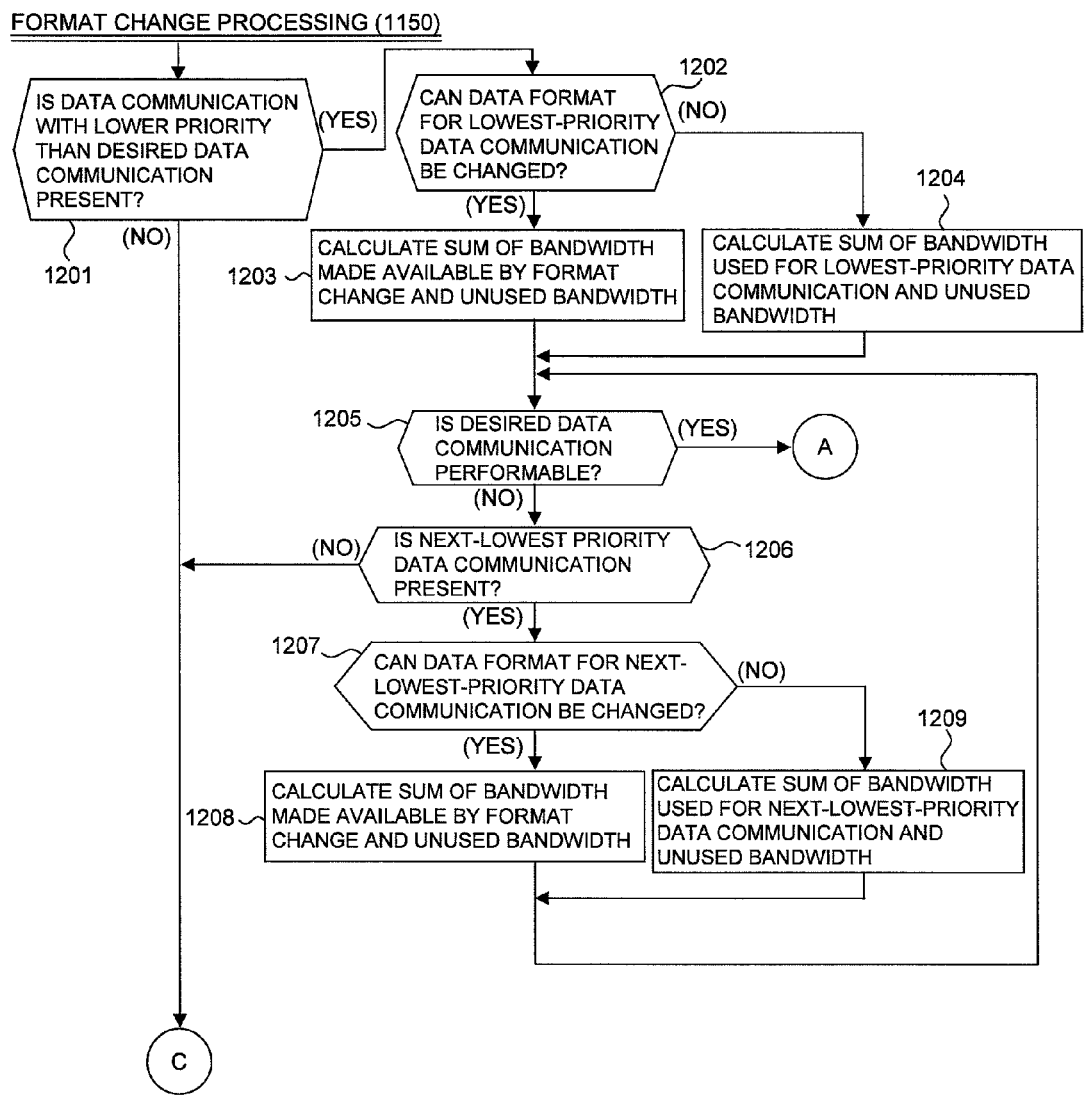
FIG. 13 is a flowchart showing a processing sequence for a format change.

FIG. 13 shows a processing sequence for the format change processing (step 1150). Based on the priority of each data communication recalculated in step 1100, the bandwidth management device 160 determines, in step 1201, whether or not there is any data communication with priority lower than that of the desired data communication. When it is determined that there are such data communications with lower priority, the bandwidth management device 160 determines in step 1202, by referring to the usable format 222 in the bandwidth management table 215, whether or not the data format used for the data communication with the lowest priority among all such lower-priority data communications can be changed. When it is determined in step 1202 that the data format can be changed, the sum of the bandwidth made available by changing the format and the currently unused bandwidth is calculated in step 1203. When it is determined in step 1202 that the data format cannot be changed, the sum of the bandwidth being used for the lowest-priority data communication and the currently unused bandwidth is calculated in step 1204.

In step 1205, whether or not the total bandwidth calculated in step 1203 or 1204 can make the desired data communication performable is determined.

When it is determined in step 1205 that the desired data communication can be performed, a processing sequence similar to that beginning with step 720 shown in FIG. 8A is performed.

When it is determined in step 1205 that the desired data communication cannot be performed, whether or not there is data communication with the next lowest priority is determined in step 1206.

When it is determined in step 1206 that there is data communication with the next lowest priority, the CPU 202 determines in step 1207, by referring to the usable format 222 in the bandwidth management table 215, whether or not the data format used for the data communication with the next lowest priority can be changed.

When it is determined in step 1207 that the data format can be changed, the CPU 202 calculates, in step 1208, the sum of the bandwidth made available by changing the data format and the currently unused bandwidth. The bandwidth made available by changing the data format is inclusive of the bandwidth made available in step 1203 or 1204.

When it is determined in step 1207 that the data format cannot be changed, the CPU 202 calculates, in step 1209, the sum of the bandwidth being used for the data communication with the next lowest priority and the currently unused bandwidth. The bandwidth being used for the data communication with the next lowest priority is inclusive of the bandwidth made available in step 1203 or 1204.

Based on the total bandwidth calculated in step 1208 or 1209, the CPU 202 determines, in step 1205, whether or not the desired data communication can be performed.

When it is determined in step 1205 that the desired data communication cannot be performed, the CPU 202 proceeds to repeat the processing sequence of steps 1206 to 1209 as long as there is data communication present with lower priority than the priority of the desired data communication. In cases where the desired data communication cannot be performed even when the data format used for a lower-priority data communication is changed, processing step 1209 may be performed, instead of changing the data format, to discontinue the lower-priority data communication and acquire the required bandwidth.

When, as a result of performing the processing of steps 1202 to 1209, the desired data communication is made performable, the CPU 202 performs a processing sequence similar to the processing sequence beginning with step 720 as shown in FIG. 8A.

In cases where, even after performing the processing of steps 1202 to 1209, the desired data communication cannot be performed, the CPU 202 determines that the bandwidth required for the desired data communication cannot be acquired and ends the format change processing of step 1150. The priority bandwidth control processing (step 524) has been described above.

Referring to FIG. 5, the bandwidth management device 160 repeatedly performs the bandwidth acquisition control processing (step 504), requested-period extension processing (step 514), and priority bandwidth control processing (step 524).

The above embodiment provides the following operational advantages.

[1] The bandwidth management device 160 used in the embodiment variably allocates a bandwidth for use by a processing device based on a bandwidth request received from the processing device, so that an optimum bandwidth for data communication by the processing device can be allocated. In cases where an adequate bandwidth cannot be allocated to the additional processing device when an additional processing device is added to the network, a processing device transmitting video data of a resolution higher than corresponding to the user's intention is requested to change the data format, so as to allow an adequate bandwidth to be allocated to the additional processing device. Hence, the bandwidth management device 160 makes it possible to flexibly control bandwidth settings and setting changes for a communication network.

[2] Bandwidth allocation is controlled by referring to the bandwidth management information, corresponding to each processing device, held in the bandwidth management table, so that the bandwidth management information can be managed with ease.

[3] When an electronic device is initially recognized as a processing device, the bandwidth management device 160 enters identification information about the electronic device and data attribute information about the data to be transmitted by the electronic device as entry data in the bandwidth management table. In this way, electronic devices participating in the communication network can be easily identified.

[4] A MAC addresses is used as the identification information about each electronic device, so that each electronic device can be uniquely identified. With the attribute information specifying a usable data format, a bandwidth required for desired data communication can be easily determined.

[5] Information about a processing device to be entered as initial entry data in the bandwidth management table is collected from the beacon information included in a superframe used for Wireless USB communication, so that the data processors present in the network can easily recognize, based on the beacon information, the presence of a processing device joining the network and can easily acquire, from the beacon information, the MAC address of and the usable data format for the processing device.

[6] Bandwidth allocation is arranged according to bandwidth acquisition commands received from individual processing devices enabling variable bandwidth allocation control. Even when there is no unused bandwidth for allocation to a processing device, the bandwidth required for the processing device may be made available by reducing the bandwidth allocated to another processing device or by discontinuing the communication being performed by another processing device.

When, to make a bandwidth required for a processing device available, reducing the bandwidth allocated to another processing device or discontinuing the communication being performed by another processing device, the target processing device is selected according to ascending communication priority, so that the processing device with the lowest communication priority is selected first. Namely, the communications with higher priority are less affected by other communications.

When there is no communication present with lower priority than that of an electronic device requesting bandwidth acquisition, the bandwidth for another electronic device with the same priority as that of the electronic device requesting bandwidth acquisition can be reduced to make a bandwidth required for the electronic device requesting bandwidth acquisition available.

The invention made by the present inventors has been described based on an embodiment, but the invention is not limited to the embodiment and can be modified in various ways without departing from the spirit and scope of the invention.

Each data processor, for example, may be either a part of a specific electronic device or a discrete device. It may be a single-chip or multi-chip semiconductor device.

The communication network is not limited to a network complying with a Wireless USB protocol and it may be appropriately modified. The communication is not limited to one making use of beacon information. The bandwidth is not limited to a data bandwidth set in medium access slots. It may be, for example, a frequency bandwidth.

What is claimed is:

1. A data processor for managing a bandwidth for use by an electronic device participating in a communication network, comprising:
    a wireless communication section communicating with the electronic device and
    a bandwidth management section performing control to variably allocate, based on a request from the electronic device, a bandwidth to be used for communication performed by the electronic device,
    wherein the bandwidth management section comprises a bandwidth management table and performs bandwidth allocation control by referring to information recorded in the bandwidth management table,
    wherein the bandwidth management table comprises a field for holding information for use in managing the bandwidth for the electronic device,
    wherein the bandwidth management section records, upon recognizing an additional electronic device, identification information identifying the additional electronic device and attribute information about data to be transmitted by the additional electronic device as new entry data in the bandwidth management table,
    wherein the identification information represents a MAC address, and the attribute information represents a usable data format, and
    wherein the MAC address information and the usable data format information is information contained in beacon information included in a superframe used in UWB communication.

2. A data processor for managing a bandwidth for use by an electronic device participating in a communication network, comprising:
    a wireless communication section communicating with the electronic device and
    a bandwidth management section performing control to variably allocate, based on a request from the electronic device, a bandwidth to be used for communication performed by the electronic device,
    wherein the bandwidth management table comprises a bandwidth management table and performs bandwidth allocation control by referring to information recorded in the bandwidth management table,
    wherein the bandwidth management table comprises a field for holding information for use in managing the bandwidth for the electronic device,
    wherein the bandwidth management section records, upon recognizing an additional electronic device, identification information identifying the additional electronic device and attribute information about data to be transmitted by the additional electronic device as new entry data in the bandwidth management table, and
    wherein, when a bandwidth acquisition command is received from the electronic device: the bandwidth management section determines, by referring to the bandwidth management table, whether or not a requested bandwidth can be acquired and requests, as required, another electronic device to change the bandwidth used thereby or discontinue communication being performed thereby; and, when it is determined that the request made by the bandwidth acquisition command can be met, the bandwidth management section updates entry data corresponding to the electronic device recorded in the bandwidth management table with information about the bandwidth that can be acquired for the electronic device and information about the destination address for transmission to be made using the bandwidth whereas, when it is determined that the request cannot be met, the bandwidth management section sends a notice of that effect to the electronic device having issued the bandwidth acquisition command.

3. The data processor according to claim 2, wherein, in determining whether or not the requested bandwidth can be acquired, the bandwidth management section: requests, when there is communication present with priority lower than that of communication to be performed using the bandwidth requested by the bandwidth acquisition command, the data format for such lower-priority communication to be changed so as to make the bandwidth requested by the bandwidth acquisition command available; or requests, when there is no such lower-priority communication present, the data format used by the electronic device having issued the bandwidth acquisition command to be changed; or requests, when the data format used by the electronic device having issued the bandwidth acquisition command cannot be changed whereas there is communication present with a same priority as the priority of communication to be performed using the bandwidth requested by the bandwidth acquisition command, the data format used for such same-priority communication to be changed so as to make the bandwidth requested by the bandwidth acquisition command available; or determines, when there is no such same-priority communication present, that the bandwidth requested by the bandwidth acquisition command is not available and transmits a notice of that effect to the electronic device having issued the bandwidth acquisition command.

4. The data processor according to claim 3, wherein the bandwidth management section requests, when there is communication present with priority lower than that of communication to be performed using the bandwidth requested by the bandwidth acquisition command, the data format for such lower-priority communication to be changed so as to make the bandwidth requested by the bandwidth acquisition command available and wherein, if a response informing that the data format for such lower-priority communication cannot be changed is received whereas the sum of a bandwidth used for communication with a lowest priority and a currently unused bandwidth at least equals the bandwidth requested by the bandwidth acquisition command, the bandwidth management section requests the data format used for such lowest-priority communication to be changed so as to make the requested bandwidth available.

5. The data processor according to claim 3, wherein the bandwidth management section requests, when there is communication present with a same priority as that of communication to be performed using the bandwidth requested by the bandwidth acquisition command, the data format for such same-priority communication to be changed so as to make the requested bandwidth available.

6. A communication system comprising an electronic device which can participate in a communication network together with the data processor according to claim 2, the electronic device comprising:
  a communication section for engaging in communication with the data processor and another electronic device;
  an interface section which, when a request for changing a bandwidth or discontinuing communication transmitted, as required, from the bandwidth management section of the data processor is received, displays the request and from which a response to the request is inputted; and
  a control section for controlling display in and input operation from the interface section.

7. The communication system according to claim 6, wherein the bandwidth is a data bandwidth set in medium access slots included in a superframe used for UWB communication.

* * * * *